US011395266B2

(12) United States Patent
Guo et al.

(10) Patent No.: US 11,395,266 B2
(45) Date of Patent: Jul. 19, 2022

(54) METHOD AND APPARATUS FOR TRANSMISSION OR RECEPTION USING BEAMFORMING IN A WIRELESS COMMUNICATION SYSTEM

(71) Applicant: ASUSTek Computer Inc., Taipei (TW)

(72) Inventors: Yu-Hsuan Guo, Taipei (TW); Richard Lee-Chee Kuo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/656,904

(22) Filed: Jul. 21, 2017

(65) Prior Publication Data

US 2018/0027585 A1 Jan. 25, 2018

Related U.S. Application Data

(60) Provisional application No. 62/365,540, filed on Jul. 22, 2016.

(51) Int. Cl.
*H04W 72/12* (2009.01)
*H04W 72/04* (2009.01)
(Continued)

(52) U.S. Cl.
CPC ...... *H04W 72/0406* (2013.01); *H04B 7/0408* (2013.01); *H04B 7/0413* (2013.01); *H04B 7/0695* (2013.01); *H04B 7/088* (2013.01); *H04L 5/0048* (2013.01); *H04W 16/28* (2013.01); *H04W 72/048* (2013.01);
(Continued)

(58) Field of Classification Search
None
See application file for complete search history.

(56) References Cited

U.S. PATENT DOCUMENTS

| 2010/0238824 | A1* | 9/2010 | Farajidana | H04B 7/0417 370/252 |
| 2013/0045690 | A1* | 2/2013 | Seol | H04B 7/0417 455/63.4 |

(Continued)

FOREIGN PATENT DOCUMENTS

| CN | 101253788 | 8/2008 |
| CN | 103733540 | 4/2014 |

(Continued)

OTHER PUBLICATIONS

Office Action from the Japan Patent Office from corresponding JP Application No. 2017-141429, dated Sep. 11, 2018.

(Continued)

*Primary Examiner* — Ajit Patel
*Assistant Examiner* — Pamit Kaur
(74) *Attorney, Agent, or Firm* — Cooper Legal Group LLC

(57) ABSTRACT

Methods and apparatuses for transmission or reception using beamforming in a wireless communication system are disclosed herein. In one method, a user equipment provides information related to a combination of UE beams to a network node, wherein UE beams in the combination can be generated by the UE at the same time. The UE receives, from the network node, a scheduling information for a transmission or a reception. The UE generates one or more UE beams in the combination to perform the transmission or the reception.

20 Claims, 19 Drawing Sheets

(51) Int. Cl.
  *H04B 7/06* (2006.01)
  *H04B 7/08* (2006.01)
  *H04B 7/0408* (2017.01)
  *H04B 7/0413* (2017.01)
  *H04L 5/00* (2006.01)
  *H04W 16/28* (2009.01)
  *H04W 88/08* (2009.01)

(52) U.S. Cl.
  CPC ...... *H04W 72/1284* (2013.01); *H04W 72/046* (2013.01); *H04W 72/0446* (2013.01); *H04W 88/08* (2013.01)

(56) References Cited

U.S. PATENT DOCUMENTS

| | | | | |
|---|---|---|---|---|
| 2013/0072243 | A1* | 3/2013 | Yu | H04B 7/0695 455/509 |
| 2013/0223251 | A1* | 8/2013 | Li | H04B 7/0619 370/252 |
| 2013/0286960 | A1* | 10/2013 | Li | H04W 72/042 370/329 |
| 2013/0301454 | A1* | 11/2013 | Seol | H04B 7/043 370/252 |
| 2017/0034812 | A1* | 2/2017 | Deng | H04W 72/046 |
| 2018/0343043 | A1* | 11/2018 | Hakola | H04B 7/0417 |
| 2018/0351624 | A1* | 12/2018 | Hakola | H04B 7/0617 |

FOREIGN PATENT DOCUMENTS

| | | |
|---|---|---|
| JP | 2014524705 | 9/2014 |
| JP | 2015523757 | 8/2015 |

OTHER PUBLICATIONS

European search report from corresponding EP Patent Application No. 17182555.7, dated Dec. 20, 2017.
Office Action from the Taiwan Intellectual Property Office in corresponding TW Application No. 106124663, dated Oct. 3, 2018.
Office Action from the Korean Intellectual Property Office in corresponding KR Application No. 10-2017-0092978, dated Sep. 27, 2018.
Communication pursuant to Article 94(3) EPC in corresponding EP Application No. 17182555.7, dated Apr. 10, 2019.
Office Action from State Intellectual Property Office in corresponding CN Application No. 201710602051.5, dated Aug. 27, 2019.
Samsung: "Discussion on terminology of beamforming based high frequency NR", 3GPP TSG-RAN WG2 Meeting #94, R2-163716, 20160513.
Office Action from SIPO in corresponding SIPO Application No. 201710602051.5, dated Dec. 3, 2019.
Office Action from Japan Patent Office in corresponding JP Application No. 2019-128920, dated Jun. 16, 2020.
Office Action from Intellectual Property India in corresponding IN Application No. 201744025944, dated Nov. 14, 2019.

* cited by examiner

Different deployment scenarios with Single TRP cell

Different deployment scenarios with multiple TRPs Cell

METHOD AND APPARATUS FOR TRANSMISSION OR RECEPTION USING BEAMFORMING IN A WIRELESS COMMUNICATION SYSTEM

CROSS-REFERENCE TO RELATED APPLICATIONS

The present Application claims the benefit of U.S. Provisional Patent Application Ser. No. 62/365,540 filed on Jul. 22, 2016, the entire disclosure of which is incorporated herein in its entirety by reference.

FIELD

This disclosure generally relates to wireless communication networks, and more particularly, to a method and apparatus for transmission or reception using beamforming in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for transmission or reception using beamforming in a wireless communication system are disclosed herein. In one method, a user equipment provides information related to a combination of UE beams to a network node, wherein UE beams in the combination can be generated by the UE at the same time. The UE receives, from the network node, a scheduling information for a transmission or a reception. The UE generates one or more UE beams in the combination to perform the transmission or the reception.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts"; R2-163716, "Discussion on terminology of beamforming based high frequency NR"; R2-162709, "Beam support in NR"; R2-162762, "Active Mode Mobility in NR: SINR drops in higher frequencies"; R3-160947, TR 38.801 V0.1.0, "Study on New Radio Access Technology; Radio Access Architecture and Interfaces"; R2-164306, "Summary of email discussion [93bis #23][NR] Deployment scenarios"; RAN2 #94 meeting minute; R2-163879, "RAN2 Impacts in HF-NR"; R2-162210, "Beam level management <->Cell level mobility"; R2-163471, "Cell concept in NR"; R2-164270, "General considerations on LTE-NR tight interworking"; R2-162251, "RAN2 aspects of high frequency New RAT"; R1-165364, "Support for Beam Based Common Control Plane"; and TS 36.321 V13.0.0, "Medium Access Control (MAC) protocol specification". The standards and documents listed above are hereby expressly incorporated by reference in their entirety.

Figure 1:
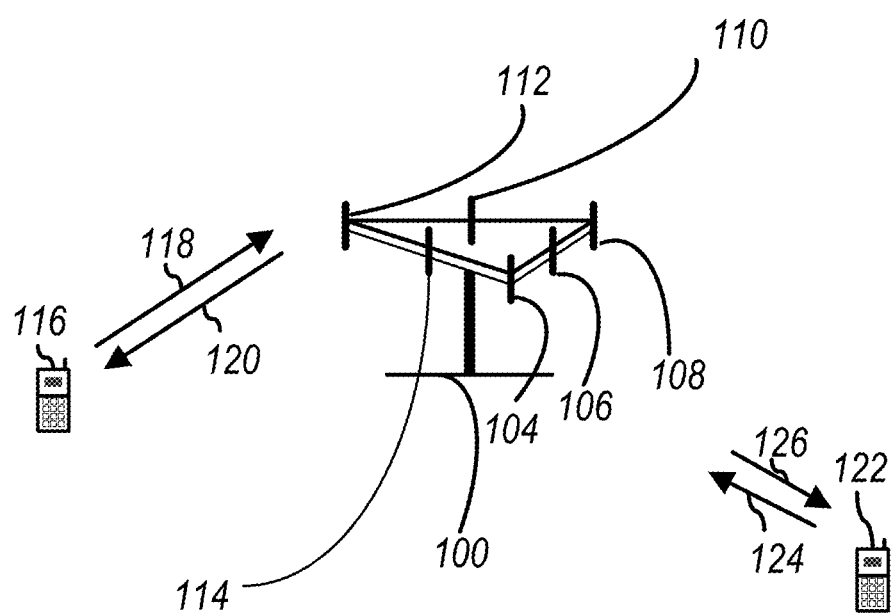
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
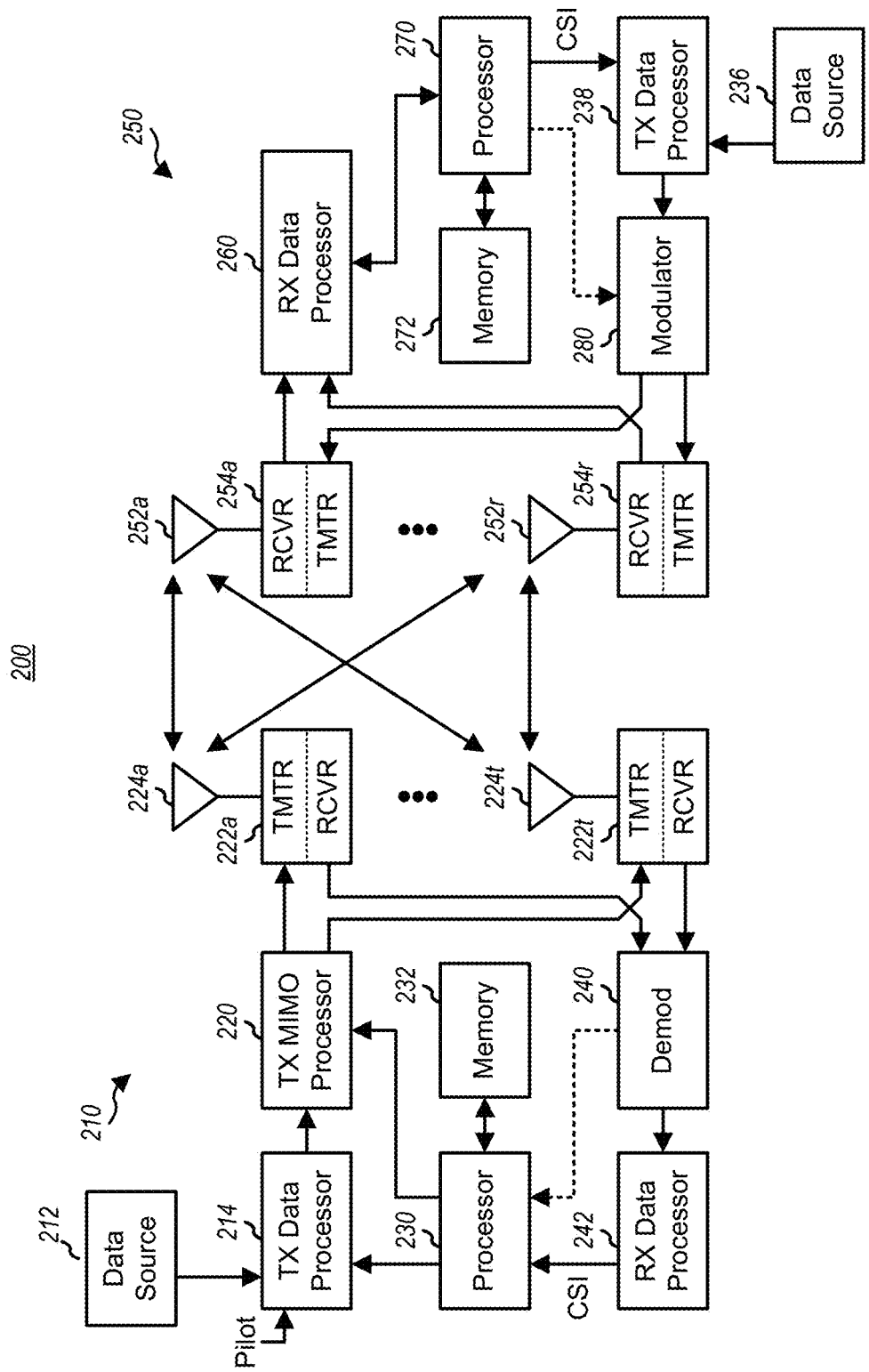
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
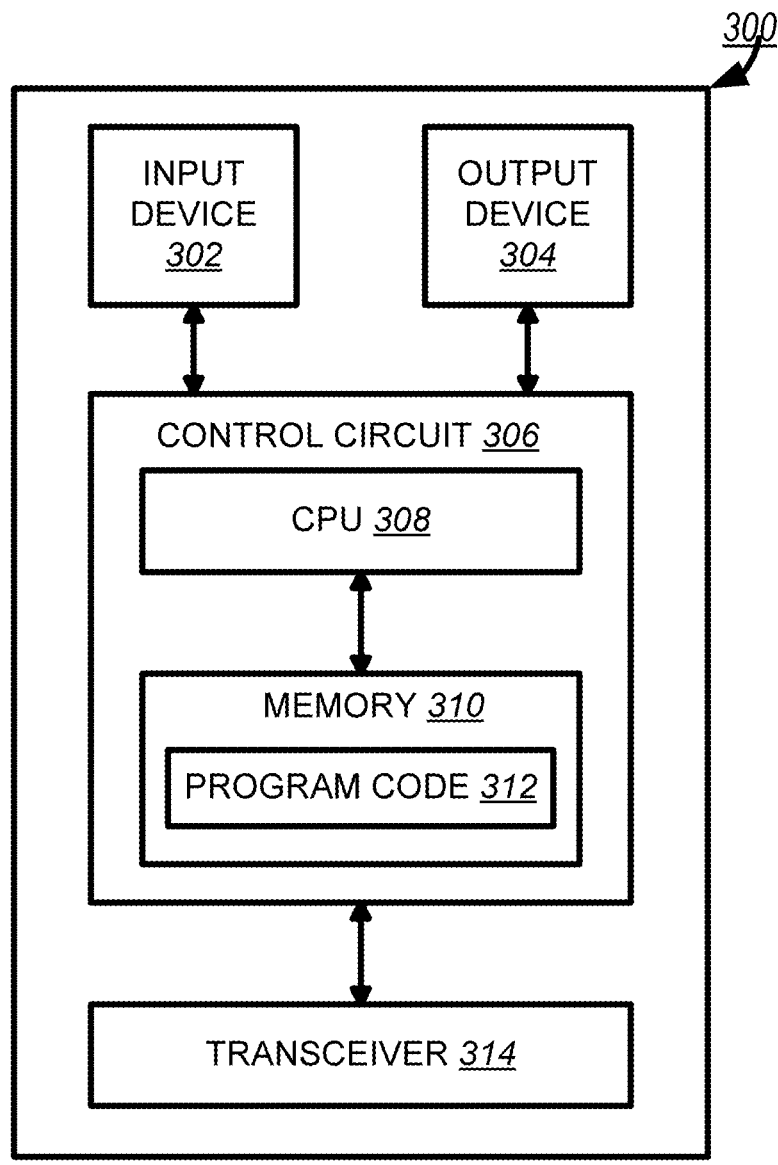
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
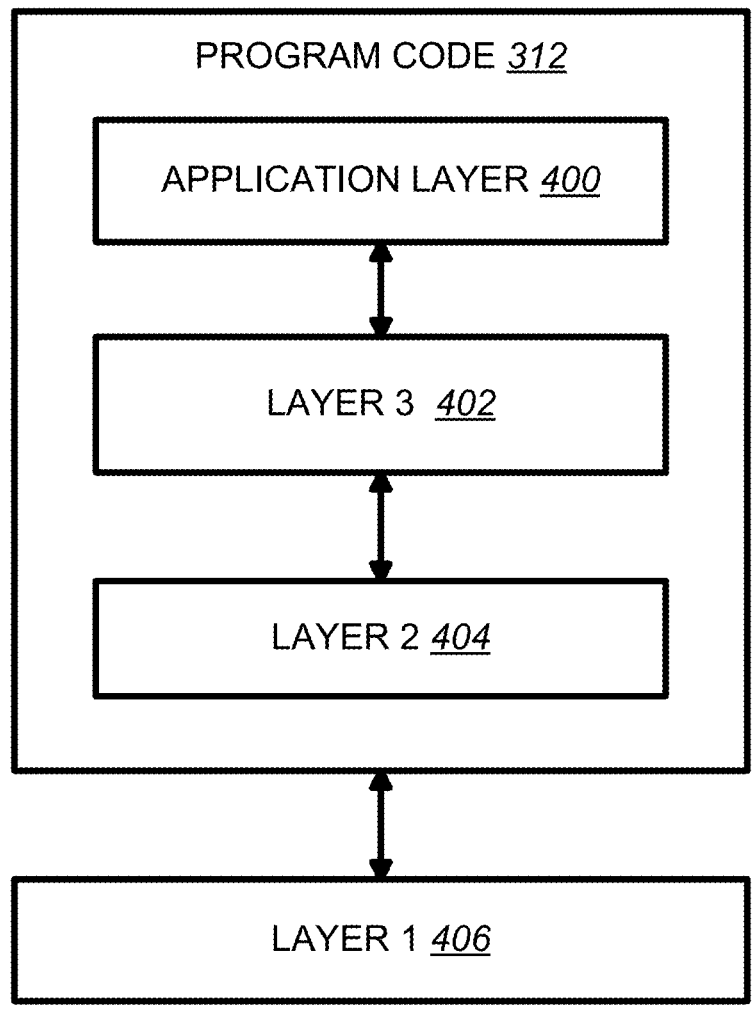
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020: eMBB (enhanced Mobile Broadband); mMTC (massive Machine Type Communications); and URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g. current LTE bands <6 GHz), the required cell coverage may be provided by forming a wide sector beam for transmitting downlink common channels. However, utilizing wide sector beam on higher frequencies (>>6 GHz), cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 5:
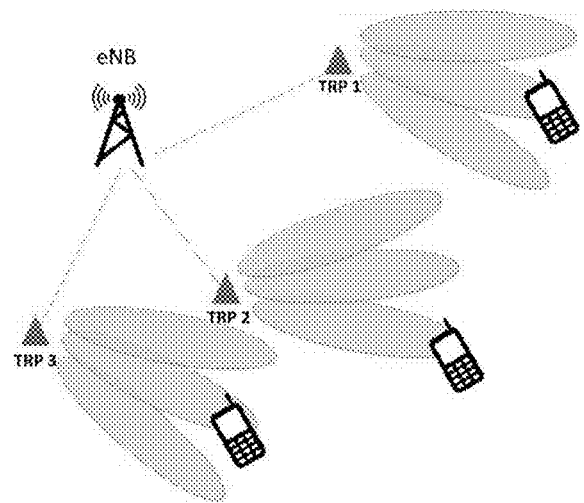
FIG. 5 illustrates a beam concept in 5G.

Based on 3GPP R2-162709 and as shown in FIG. 5, an evolved Node B may have multiple Transmission/Reception Points (TRPs) that are either centralized or distributed. Each TRP can form multiple beams. The number of beams and the number of simultaneous beams in the time/frequency domain depend on the number of antenna array elements and the RF at the TRP.

Potential mobility type for New RAT (NR) can be listed: intra-TRP mobility; inter-TRP mobility; and inter-NR eNB mobility.

Based on 3GPP R2-162762, the reliability of a system that relies on beamforming and operating in higher frequencies may be challenging because coverage may be be more sensitive to both time and space variations. As a consequence, the signal-to-interference plus noise ratio (SINR) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker as compared to wide area coverage as provided by LTE.

Figure 6:
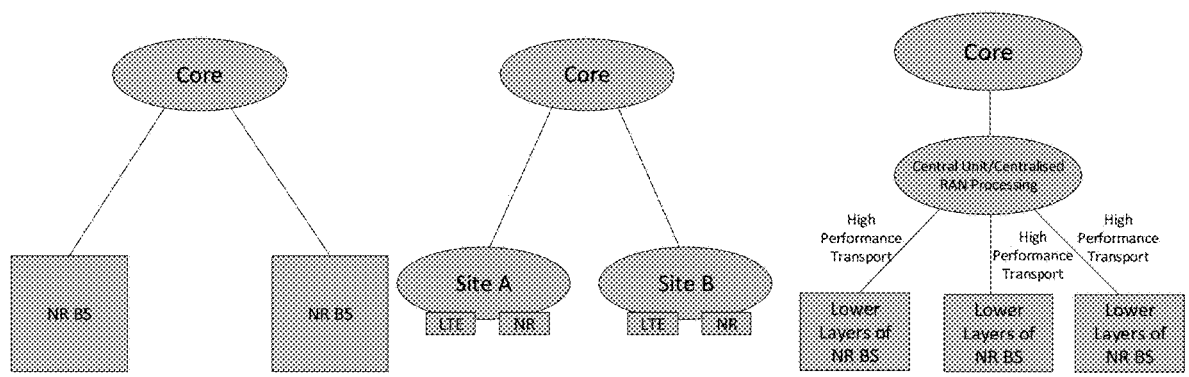
FIG. 6 illustrates stand-alone, co-sited with LTE, and centralized baseband networks.
Figure 7:
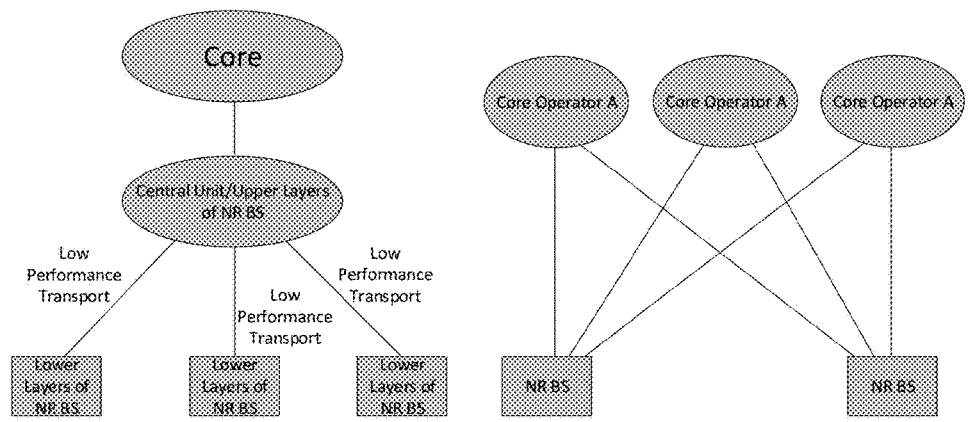
FIG. 7 illustrates a network having centralized with lower performance transport and Shared RAN.

Based on 3GPP R3-160947, TR 38.801 V0.1.0, the scenarios illustrated in FIGS. 6 and 7 should be considered for support by the NR radio network architecture.

Based on R2-164306, the following scenarios in terms of cell layout for standalone NR are captured to be studied: macro cell only deployment; heterogeneous deployment; and small cell only deployment.

Based on 3GPP RAN2 #94 meeting minute, one NR eNB corresponds to one or many TRPs. Two levels of network controlled mobility: RRC driven at 'cell' level; and zero/minimum RRC involvement (e.g. at MAC/PHY).

Based on 3GPP R2-162210, in 5G, the principle of 2-level mobility handling may possibly be kept:
A) Cell Level Mobility
   a. Cell selection/reselection in IDLE, handover in the connected state (CONN)
   b. Handled by Radio Resource Control (RRC) in CONN state
B) Beam Level Management
   a. L1 handles appropriate selection of the TRP to use for a UE and the optimal beam direction 5G systems are expected to rely more heavily on "beam based mobility" to handle UE mobility, in addition to regular handover based UE mobility. Technologies like Multiple Input Multiple Output (MIMO), fronthauling, Cloud RAN (C-RAN) and Network Function Virtualization (NFV) will allow the coverage area controlled by one "5G Node" to grow, thus increasing the possibilities for beam level management and reducing the need for cell level mobility. All mobility within the coverage area of one 5G node could in theory be handled based on beam level management, which would leave handovers only to be used for mobility to the coverage area of another 5G Node.

Figure 8:
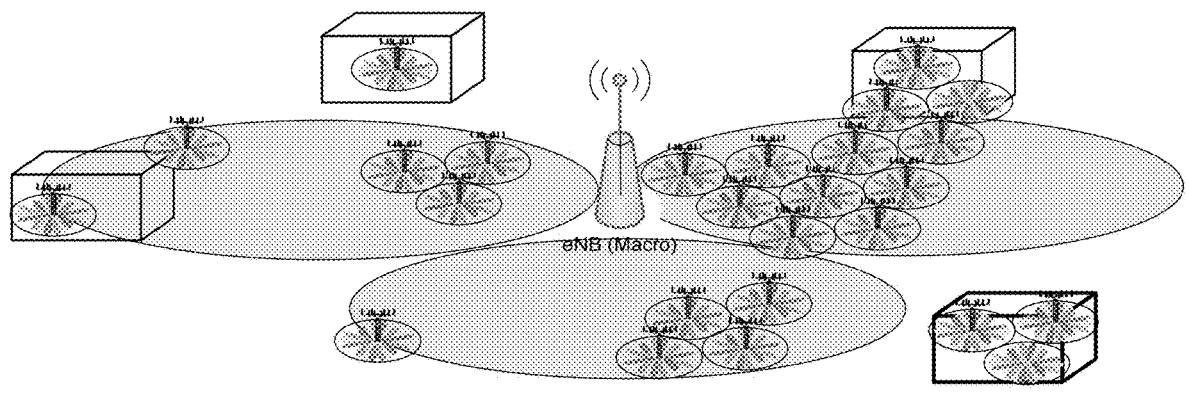
FIG. 8 illustrates different deployment scenarios with a single TRP cell.
Figure 9:
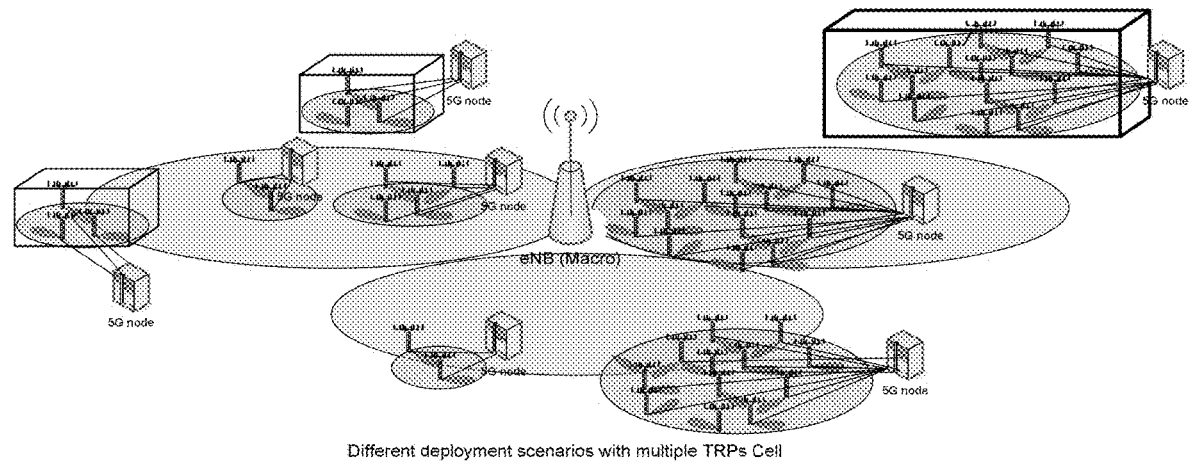
FIG. 9 illustrates different deployment scenarios with multiple TRP cells.
Figure 10:
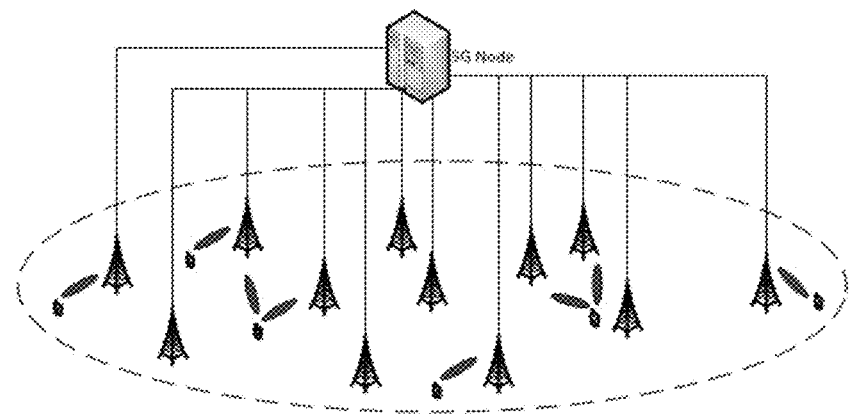
FIG. 10 illustrates a 5G cell having a 5G node with multiple TRPs.
Figure 11:
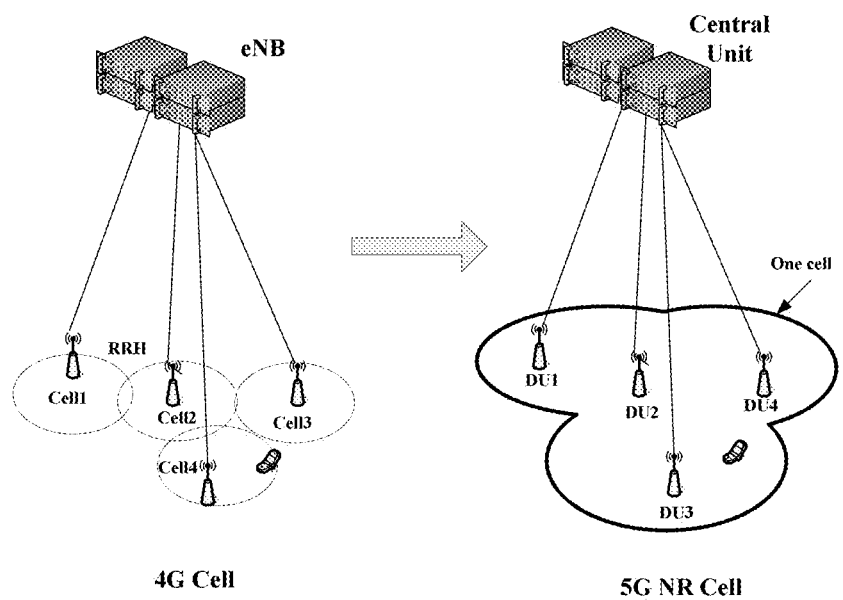
FIG. 11 illustrates a comparison between a LTE cell and a NR cell.

FIGS. 8-11 illustrate some examples of the concept of a cell in 5G NR. FIG. 8 illustrates a deployment with single TRP cell. FIG. 9 illustrates a deployment with multiple TRP cells. FIG. 10 illustrates one 5G cell comprising a 5G node with multiple TRPs. FIG. 11 illustrates a comparison between a LTE cell and a NR cell.

Apart from the handover based on a Radio Resource Management (RRM) measurement, a 5G UE should be able to adapt the serving beam to maintain 5G connectivity subject to beam quality fluctuation or UE intra-cell mobility. In order to accomplish this, a 5G Node-B and UE should be able to track and change the serving beam properly (called beam tracking hereafter).

The following terminology and assumption may be used hereafter:

Base Station (BS): a network central unit in NR which is used to control one or multiple TRPs which are associated with one or multiple cells. Communication between BS and TRP(s) is via fronthaul. A BS could also be referred to as a central unit (CU), eNB, or NodeB.

TRP: a transmission and reception point provides network coverage and directly communicates with UEs. TRP could also be referred to as distributed unit (DU).

Cell: a cell is composed of one or multiple associated TRPs, i.e. coverage of the cell is composed of coverage of all associated TRP(s). One cell is controlled by one BS. A Cell could also be referred to as a TRP group (TRPG).

Beam sweeping: in order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.

Serving beam: serving beam for a UE is a beam generated by network, e.g. TRP, which is used to communicate with the UE, e.g. for transmission and/or reception.

The following assumptions for network side may be used hereafter:

NR using beamforming could be standalone, i.e. UE can directly camp on or connect to NR.
  NR using beamforming and NR not using beamforming could coexist, e.g. in different cells.
TRP would apply beamforming to both data and control signaling transmissions and receptions.
  The number of beams generated concurrently by TRP depends on TRP capability, e.g. the maximum number of beams generated concurrently by different TRPs may be different.
  Beam sweeping is necessary in order, for example, for the control signaling to be provided in every direction.
  TRP may not support all beam combinations, e.g. some beams may not be generated concurrently.
Downlink timing of TRPs in the same cell are synchronized.
RRC layer of network side is in BS.
TRP should support both UEs with UE beamforming and UEs without UE beamforming, e.g. due to different UE capabilities or UE releases.

The following assumptions for UE side may be used hereafter:

UE may perform beamforming for reception and/or transmission, if possible and beneficial.
  The number of beams generated concurrently by UE depends on UE capability, e.g. generating more than one beam is possible.
  The beam(s) generated by UE is wider than beam(s) generated by the eNB.
  Beam sweeping for transmission and/or reception is generally not necessary for user data but may be necessary for other signaling, e.g. to perform measurement.
  UEs may not support all beam combinations, e.g. some beams could not be generated concurrently.
Not every UE supports UE beamforming, e.g. due to UE capability or UE beamforming is not supported in NR first (few) release(s).
For one UE, it may be possible to generate multiple UE beams concurrently and to be served by multiple serving beams from one or multiple TRPs of the same cell.
  Same or different (DL or UL) data could be transmitted on the same radio resource via different beams for diversity or throughput gain.
There are at least two UE (RRC) states: connected state (or called active state) and non-connected state (or called inactive state or idle state).

Figure 12:
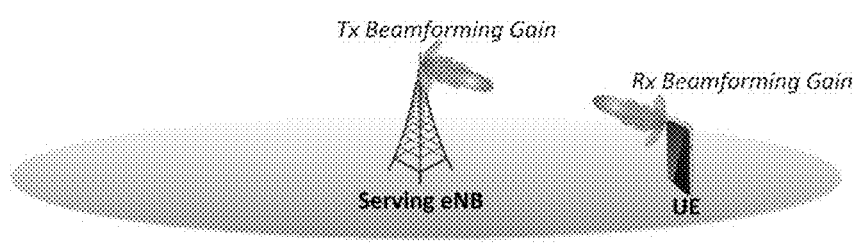
FIG. 12 illustrates gain compensation by beamforming in a HF-NR system.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 12 (reproduced from 3GPP R2-162251) illustrates gain compensation by beamforming.

Figure 13:
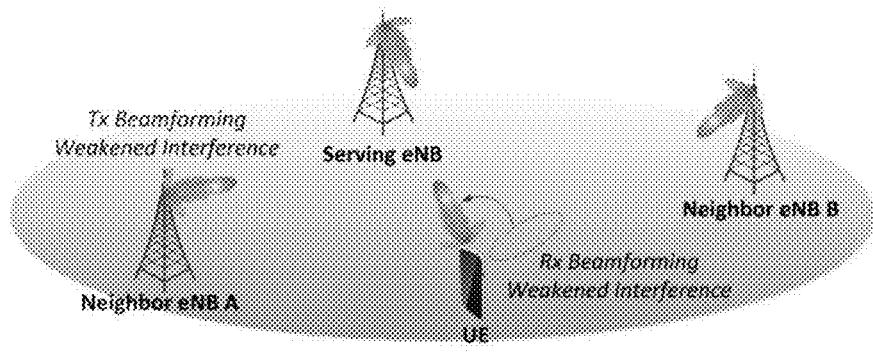
FIG. 13 illustrates weakened interference by beamforming in a HF-NR system.

In SINR perspective, sharp beamforming reduces interference power from neighbor interferers, i.e. neighbor eNBs in downlink case or other UEs connected to neighbor eNBs. In the transmission (TX) beamforming case, only interference from other TXs whose current beam points the same direction to the reception (RX) will be the "effective" interference. The "effective" interference means that the interference power is higher than the effective noise power. In RX beamforming case, only interference from other TXs whose beam direction is the same to the UE's current RX beam direction will be the effective interference. FIG. 13 (reproduced from 3GPP R2-162251) illustrates weakened interference by beamforming.

Figure 14:
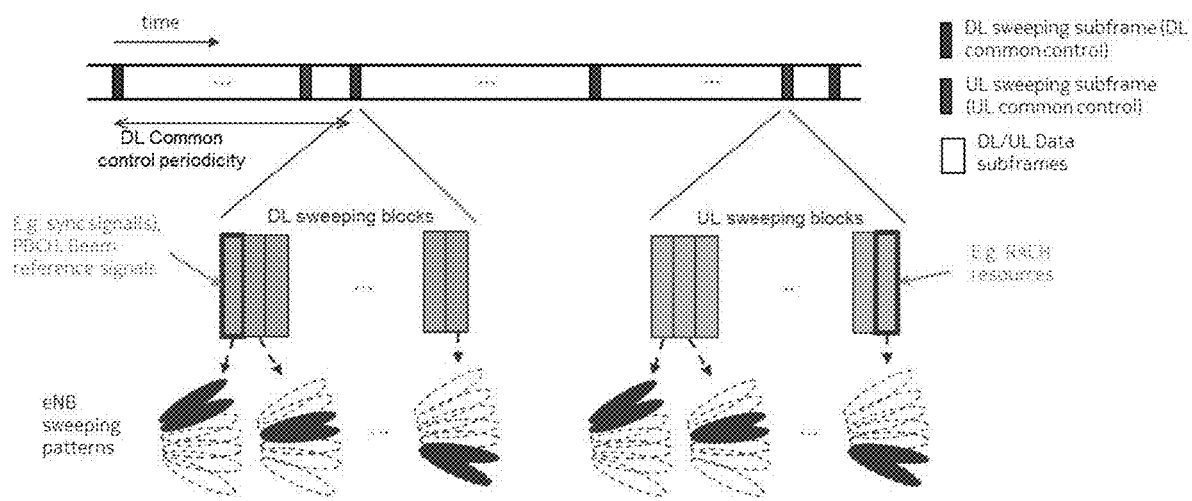
FIG. 14 illustrates a principle of a sweeping subframe.

Based on 3GPP R1-165364, it is proposed to concentrate sweeping common control plane functionality into specific subframes, called as sweeping subframes. The common control signaling to be transmitted in sweeping subframe includes synchronization signal (downlink (DL)), reference signal (DL), system information (DL), random access channel (UL), and/or the like. FIG. 14 (reproduced from 3GPP R1-165364) illustrates the principle of sweeping subframe.

One of the main use cases of downlink sweeping is downlink discovery signaling. Downlink discovery signaling includes, but is not limited to, signals for cell search, time and frequency synchronization acquisition, essential system information signalling and cell/beam measurements (e.g. RRM measurements).

Figure 15:
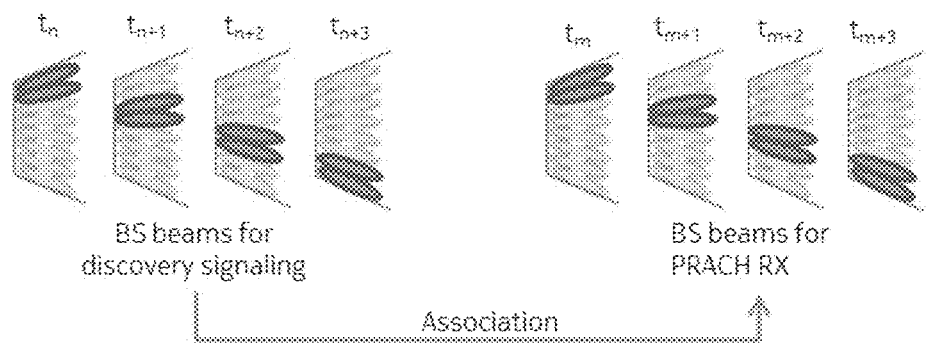
FIG. 15 illustrates one association between base station beams and PRACH resources.

For uplink Physical Random Access Channel (PRACH), the high level concept is to utilize BS beam reciprocity and enable the UE to transmit a PRACH preamble when the BS is receiving or using beam(s) with high array gain towards the transmitting UE. In other words, PRACH resources are associated with BS beams which are advertised periodically through DL discovery signaling, which conveys beam specific reference signals. FIG. 15 (reproduced from 3GPP R1-165364) illustrates the association between BS beams and PRACH resources.

Figure 16:
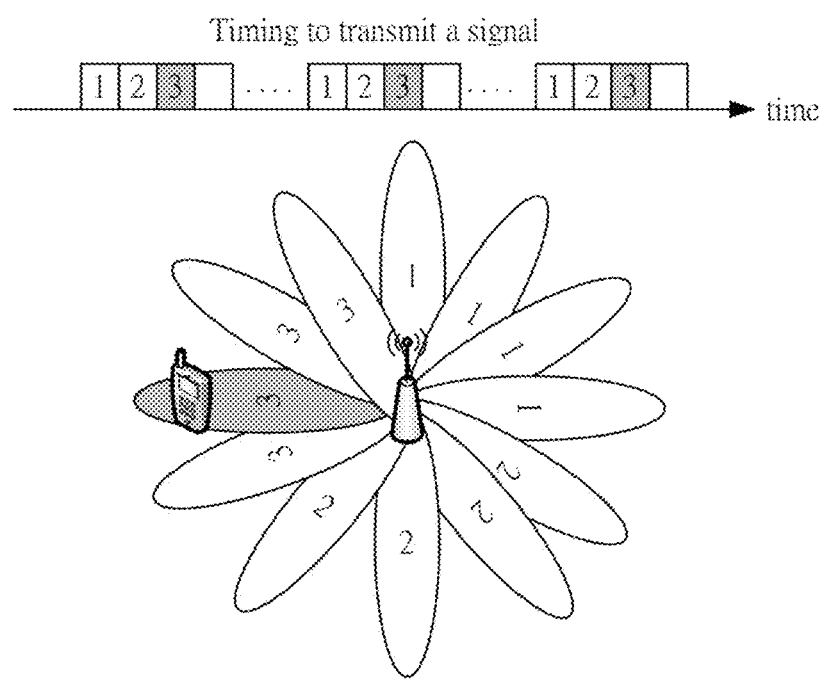
FIG. 16 illustrates one example of beam sweeping.

Since high gain beams are narrow and the number of concurrent high gain beams that can be formed may depend on cost and complexity of the utilized transceiver architecture, beam sweeping is needed for a number of times, e.g. beam sweeping number, in order to cover all possible directions for transmission and/or reception. For example, in FIG. 16, the TRP takes three time intervals to cover all directions and four beams are generated at each time interval by this TRP.

Signaling for transmission and/or reception, which needs to cover the whole cell coverage by beam sweeping, may include, but not limited to, one or more of the following: synchronization signal(s), reference signal(s), system information, paging, signal to initiate random access procedure, signals of random access procedure (e.g. random access preamble, random access response, contention resolution), or signal for DL/UL scheduling. For downlink signaling, beam sweeping is performed by a TRP for transmission and/or by a UE for reception. For uplink signaling, beam sweeping is performed by a UE for transmission and/or by a TRP for reception.

When the UE is in connected state, e.g. without data communication between network and UE for a period of time, the UE may initiate an UL transmission upon new data arrival.

A case of UL data transmission may have the following steps:

Request for Scheduling

When the UE has UL data available for transmission and has no UL resource used to transmit the UL data, the UE should be able to request UL resource for the data transmission by a request transmitted from the UE to network. UL timing of the UE may or may not be synchronized when the UE transmits the request. TRP(s) receives the request by beamforming.

UL Resource Scheduling

When network, e.g. BS or TRP, receives the request, network may schedule proper UL resource for the UE to perform UL transmission. UL timing of the UE may be adjusted together with UL resource scheduling. The UL resource scheduling is provided by beamforming.

UL Data Transmission

After the UE receives UL resource scheduling, the UE uses the UL resource to transmit pending UL data. TRP uses beamforming to receive the UL transmission from the UE.

And network, e.g. BS or TRP, may provide Hybrid Automatic Repeat Request (HARQ) feedback to the UE to indicate whether UL transmission is successfully received. The UE may need to perform retransmission if network fails to receive the UL transmission.

Figure 17:
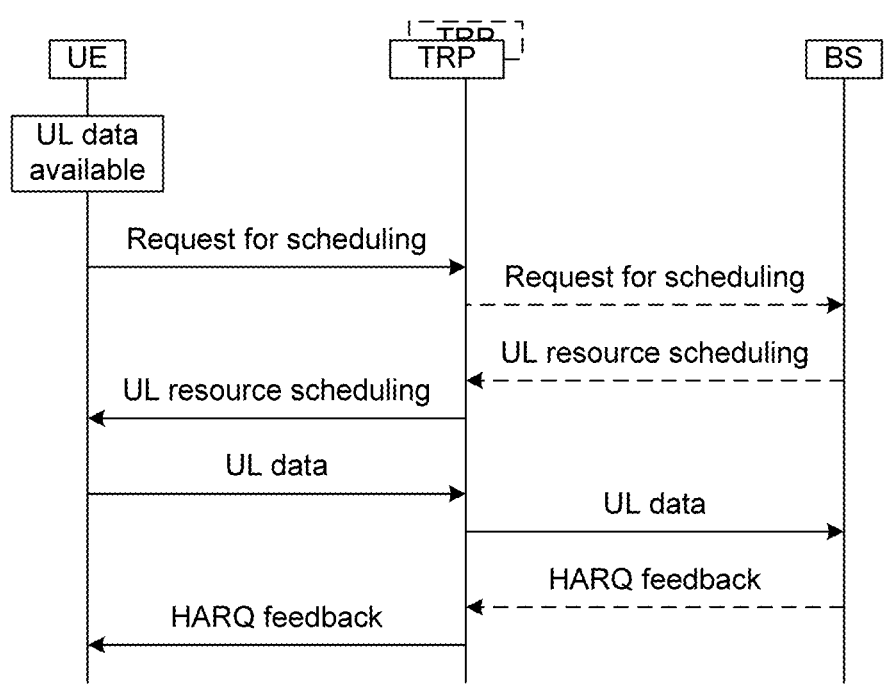
FIG. 17 illustrates one example of a flow chart for uplink transmission.

FIG. 17 illustrates an example of a flow chart for UL data transmission.

When the UE is in connected state, e.g. without data communication between network and UE for a period of time, the BS may initiate a DL transmission upon new data arrival.

A case of DL data transmission has the following steps:

Preparation before DL Transmission

When network has DL data to be transmitted to the UE, the network should determine the TRP(s) and the beam(s) to reach the UE. UL timing of the UE should be synchronized before DL transmission.

Transmission of DL Assignment and DL Data

The network, e.g. the BS or the TRP, decides the proper DL resource for transmission of the DL data and informs the UE, via a DL assignment, to receive the DL data. The DL assignment and DL data are provided by beamforming in beam(s) which can reach the UE.

The UE would provide HARQ feedback to the network to indicate whether DL transmission is successfully received. The network may need to perform retransmission if the UE fails to receive the DL transmission.

Figure 18:
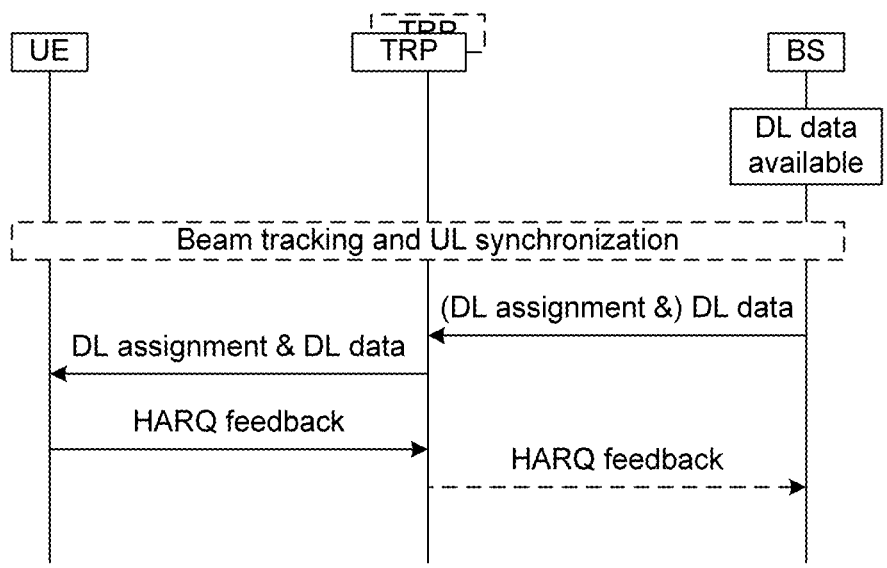
FIG. 18 illustrates one example of a flow chart for downlink transmission.

FIG. 18 illustrates an example of a flow chart for DL data transmission.

When the UE is in connected state, the UE may move among different beams or different TRPs of the same serving cell. Besides, if UE beamforming is used, UE beam(s) may also change over time, e.g. due to UE rotation.

A case of mobility in connected state without cell change has the following steps:

Configuration of Signaling for Change Detection

The change of UE beam(s), serving beam(s) of serving TRP(s), and serving TRP(s) may be detected by the UE and/or the network. In order to detect the change, a signaling periodically transmitted by TRP(s) or the UE could be a baseline approach. The configuration of the signaling should be configured to let the UE know how and when to transmit or receive the signaling.

Signaling for Change Detection

One or more TRPs periodically perform beam sweeping for the reception or transmission of the signaling. If UE beamforming is used, the UE periodically performs beam sweeping for reception or transmission of the signaling.

UE Beam Change

If UE beam change is detected by the UE, the UE itself may select the proper UE beam(s) for the following reception (and/or transmission, e.g. for TDD). Alternatively, the UE needs to provide feedback to the network, e.g. periodically or upon detection of the change, and the network could provide an indication of the UE beam change from the network to the UE. Then, the UE may use the UE beam(s) indicated by the network for the following transmission and/or reception.

If the change is to be detected by network, the indication of the UE beam change from the network to the UE may be required, e.g. periodically or upon detection of the change. The UE uses the UE beam(s) indicated by the network for the following transmission (and/or reception, e.g. for TDD).

It is possible that the change may not be detected or updated timely and it would result in beam tracking failure.

Serving Beam and/or Serving TRP Change

After the UE receives the signaling for change detection, the UE needs to provide feedback to the network, and the network could decide whether to change (DL) serving beam(s) and/or serving TRP(s) for the UE.

On the other hand, after the TRP(s) receives the signaling for a change detection, the network can decide whether to change the serving beam(s) and/or the serving TRP(s) for the UE. The indication from the network to the UE about (DL) serving beam/TRP change may be required.

It is possible that the change may not be detected or updated timely, which would result in beam tracking failure.

Figure 19:
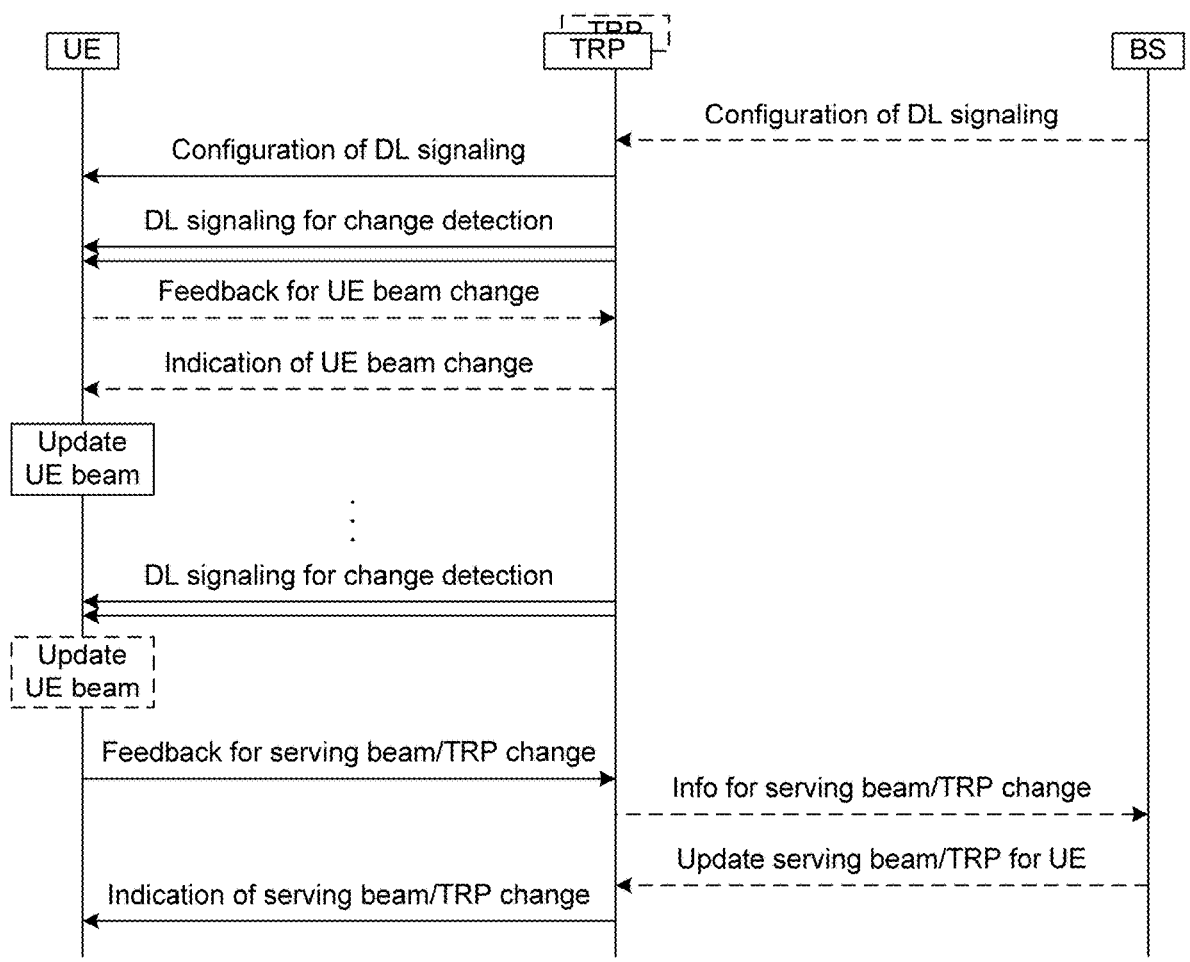
FIG. 19 illustrates one example of a flow chart for mobility in a connected state without cell change (based on UE detection).
Figure 20:
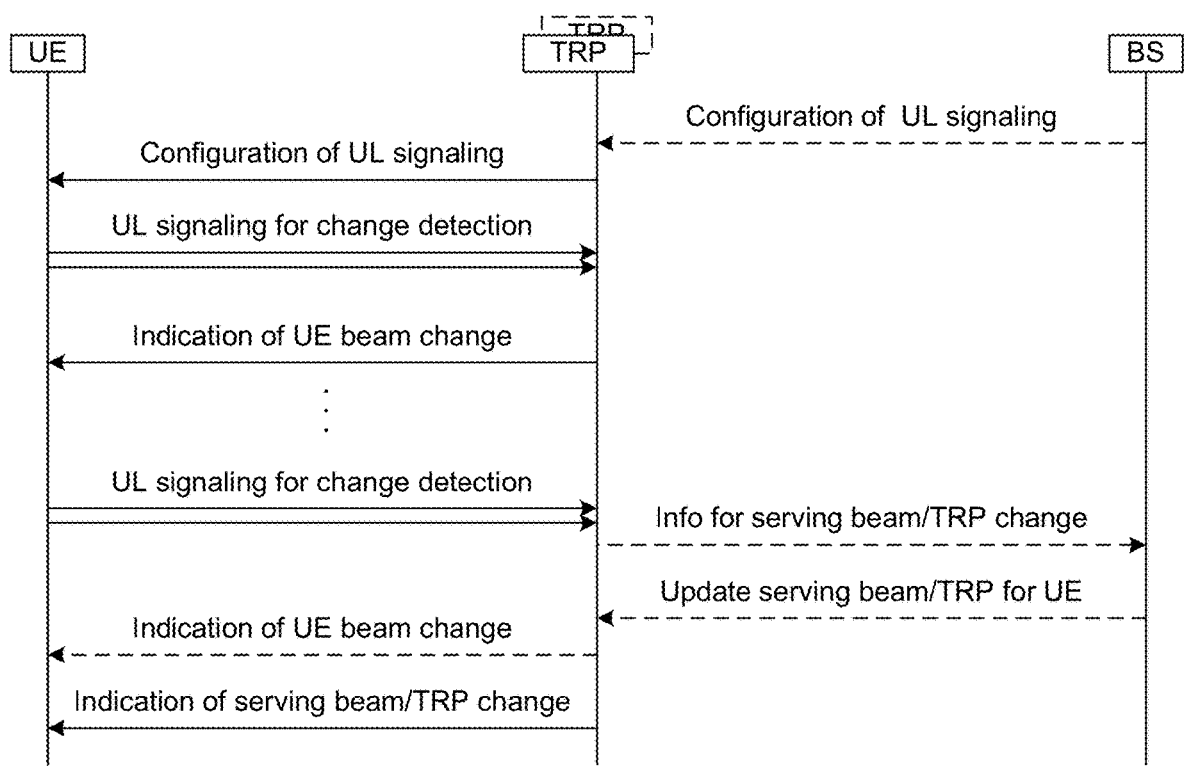
FIG. 20 illustrates one example of a flow chart for mobility in a connected state without cell change (based on network detection).

FIGS. 19 and 20 illustrate examples of flow charts for mobility in connected state without cell change.

It is possible that a UE could generate one or more UE beams at the same time. The most proper UE beam(s) used to communicate with network, e.g. a TRP, may change from time to time, e.g. due to UE mobility. Accordingly, methods for deciding which UE beam(s) to be used to transmit or receive a UL or DL transmission are needed.

For transmissions scheduled dynamically, the UE beam(s) to be used could be dynamically assigned by network, e.g.

via associated scheduling information. However, for transmissions via pre-allocated radio resources, e.g. which is not scheduled dynamically with associated scheduling information, which UE beam(s) is used should be specified.

Transmission via pre-allocated radio resources may occur periodically (e.g. periodic measurement report from UE) or occur at the timing which may not be predictable by receiver of the transmission (e.g. scheduling information transmission from network may occur during Active Time as defined in 3GPP TS 36.321 V13.0.0). The UE may not need to perform UE beam sweeping to transmit or receive the transmission. The transmission could be transmitted or received in a time interval where network would perform beam sweeping, e.g. in DL or UL sweeping subframe as discussed in 3GPP R1-165364.

Transmission via pre-allocated radio resources could be one or multiple of following signaling:
(UL) Periodic measurement feedback or report, e.g. like Channel Quality Indicator (CQI) or Channel State Information (CSI) in LTE;
(UL) Scheduling request;
(UL) Semi-persistent scheduling transmissions;
(DL) Semi-persistent scheduling transmissions;
(DL) Periodic DL signal for beam and/or TRP maintenance/change, e.g. indicating candidate of UE beam(s), network beam(s), and/or TRP(s); or
(DL) Scheduling information for DL assignment or UL resource, e.g. like Physical Downlink Control Channel (PDCCH) signal in LTE.

In a cell or for a TRP, the UE may or may not use different UE beams or more than one UE beam to transmit or receive the transmission. For example, the UE could use the same UE beam(s) to transmit or receive some or all of the above signaling in a cell or for a TRP. For different TRPs, the UE may use different UE beams to transmit or receive transmissions via pre-allocated radio resources.

The UE beam(s) used for the transmission via pre-allocated radio resources may be called special UE beam(s). UE beam(s), such as special UE beam(s), used for the transmission via pre-allocated radio resources in a cell or for a TRP could initially be the UE beam(s) used or assigned during a random access procedure for initial access or handover. Special UE beam(s) for transmitting and special UE beam(s) for receiving may be the same or different.

Figure 21:
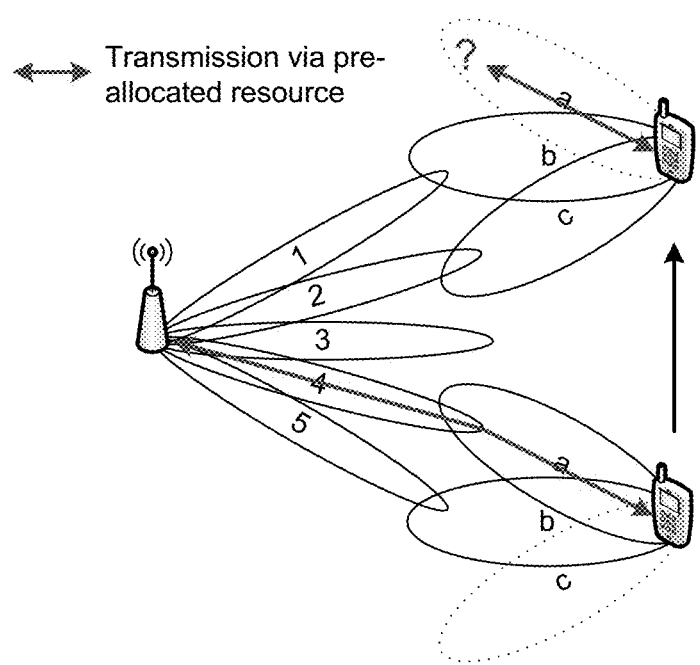
FIG. 21 illustrates one example of UE beam change.
Figure 22:
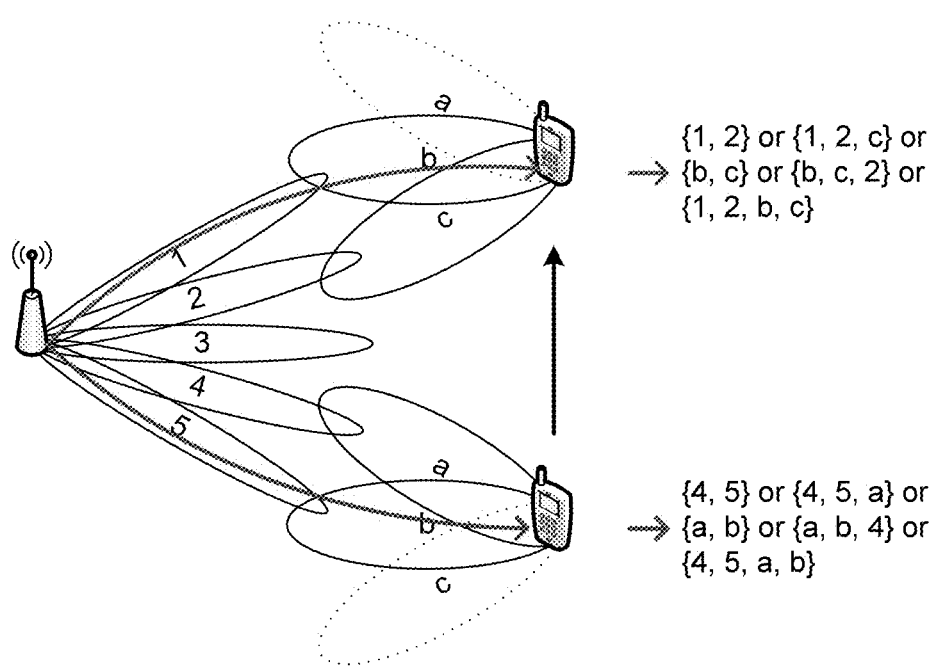
FIG. 22 illustrates one example for determining UE beam candidates.
Figure 23:
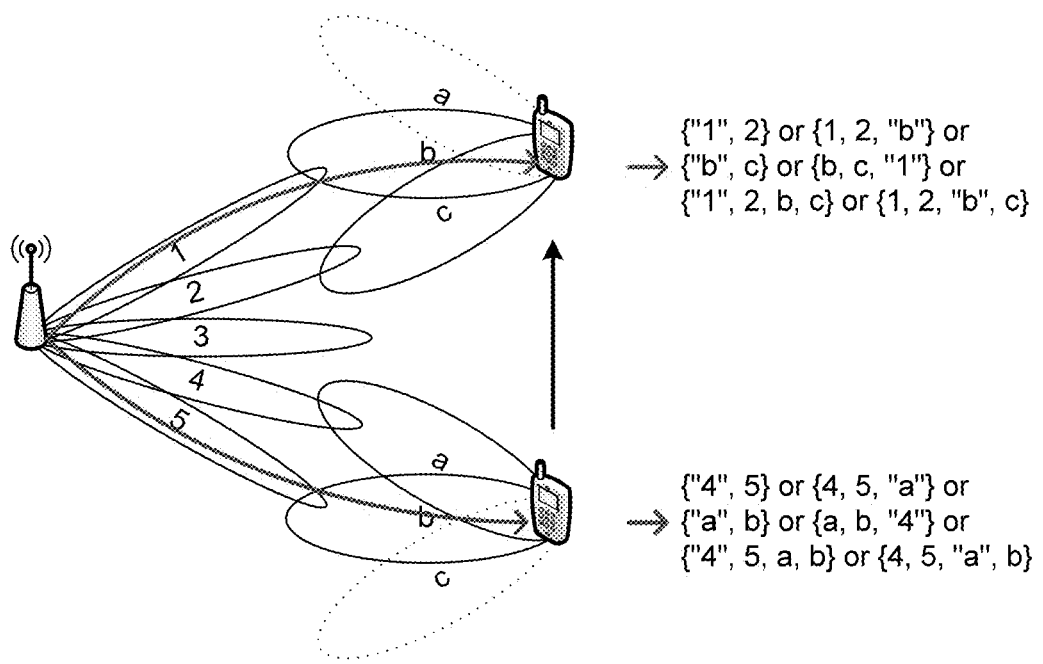
FIG. 23 illustrates one example for determining one or more special UE beams.

Several methods are considered below to decide UE beam(s) to transmit or receive a transmission via pre-allocated radio resources in a cell or for a TRP. In one method, the network chooses at least one special UE beam for the transmission. The network could change or update the special UE beam(s) (e.g., based on a measurement result and/or scheduling decision) via a periodic or non-periodic indication to the UE (e.g., indication of beam change). The indication could indicate which UE beam(s) and/or network beam(s) could be candidate(s) for communication with the network and indicate explicitly or implicitly which UE beam(s) is the special UE beam(s). FIGS. 22 and 23 are examples of indicating UE beam candidates and/or special UE beam. The special UE beam(s) could be implicitly indicated by where the indication is received. For example, after the UE moves as shown in FIG. 21, the network can indicate to the UE that beams b and c are candidates and that beam b is the special UE beam by providing the special UE beam indication via beam 1 with the indication being received by the UE via beam b.

In another method, the network chooses at least one special network beam for the UE to determine at least one special UE beam for the transmission. The network could provide an indication to indicate at least one network beam to the UE. The indicated network beam(s) in the indication may be called special network beam(s). The UE may determine the special UE beam(s) by measuring signal of the special network beam(s). For example, the UE beam(s) with received power larger than a threshold or UE beam with largest received power may be determined to be the special UE beam(s) by measuring the signal of the special network beam(s). By this way, the mapping between the UE beam(s) and the network beam(s) is known to the UE. The mapping between UE beam(s) and network beam(s) could mean that transmissions from which UE beam(s) can be received from which network beam(s), and/or transmissions from which network beam(s) can be received from which UE beam(s). Alternatively, the mapping between the UE beam(s) and the network beam(s) may be provided by the network. The UE then can determine the special UE beam(s) based on the special network beam(s) and the mapping.

The network can change or update the special network beam(s) (e.g., based on a measurement result and/or a scheduling decision) via a periodic or non-periodic indication to the UE (such as an indication of beam change). The indication can indicate which UE beam(s) and/or network beam(s) could be candidate(s) for communication with the network and indicate explicitly or implicitly which network beam(s) is/are the special network beam(s). FIGS. 22 and 23 are examples of indicating UE beam candidates and/or special UE beam. Alternatively, the indication could indicate information (such as, but not limited to, configuration) related to the signal of the special network beam(s) to be measured (e.g., Beam specific reference signal (BRS)). The special network beam(s) could be implicitly indicated by where the indication is transmitted. For example, after the UE moves as shown in FIG. 21, the network could indicate to the UE that beams b and c are candidates and beam 1 is the special network beam by providing the special UE beam indication via beam 1.

In another method, the UE determines at least one special UE beam for the transmission.

The UE determines the special UE beam(s) based on a measurement, e.g. UE beam(s) with a measured quality better than a threshold or an UE beam with best measured quality. The special UE beam(s) could be part of the UE beam candidate(s), such as those indicated by the network.

Based on the measurement, the network could predict the special UE beam(s) determined by the UE. In case that prediction may not be accurate or it is not predictable, the network could perform beam sweeping to transmit or receive the transmission.

In another method, the UE uses all of UE beam candidates for the transmission.

The UE determines the UE beam candidates based on a measurement, e.g. UE beam(s) with measured quality better than a threshold or UE beam with best measured quality. Alternatively, the UE derives UE beam candidates based on information provided by a network, e.g. the information of UE beam set.

The UE may use all the UE beam candidates to transmit or monitor the transmission at the same time.

The UE beam candidates may be for the same cell or TRP.

The indication of the special UE or network beam(s) and a configuration related to transmissions via pre-allocated radio resources may be provided via different signaling, e.g. to save signaling overhead because the configuration does not need to be changed frequently. The indication could be carried by Medium Access Control (MAC) or Physical (PHY) signaling. The configuration could be carried by a Radio Resource Control (RRC) message. The configuration could be used to indicate or be used by the UE to determine the radio resources, transmission timing, frequency resources, and/or periodicity for the transmission. The configuration could be used to indicate information for the UE to determine which UE beam(s) to be used to receive or transmit the transmission associated with the configuration, e.g. whether to use special UE beam(s) or all of the UE beam candidates for the transmission.

A network or UE beam candidate can be a beam that is qualified, e.g. with associated measured result larger than a threshold, and it can be used for communication between the UE and the network, e.g. a cell or a TRP. The number of beam candidates may be less than the number of maximum beams which could be generated concurrently. Furthermore, the UE beam candidates may be the UE beams which can be generated concurrently. The beam candidate(s) could be (periodically) indicated from the network to the UE.

The number of UE beams used for different kinds of transmission via pre-allocated radio resources may be different. For example, a portion of the UE beam candidates, such as special UE beam(s), are used for a first transmission via pre-allocated radio resources, (e.g. Semi-Persistent Scheduling (SPS)), and all of the UE beam candidates are used for a second transmission via pre-allocated radio resources such as, but not limited to, scheduling information.

A beam may be explicitly indicated and differentiated by a beam specific configuration (e.g. index), a resource for the beam, or a precoding matrix.

A network can indicate to a UE about the UE beam(s) to be used for a transmission or a reception by the UE, possibly together with a scheduling information for the transmission or the reception, e.g., in physical layer signaling like PDCCH in LTE, to enable efficient scheduling.

It is possible that the UE provides information related to UE beamforming to the network. The information can include UE beamforming capability, UE preference about UE beamforming, UE beam sweeping number, or the like.

A UE capable of UE beamforming may be able to generate more than one UE beam at the same time. However, it is possible that not all combinations of the UE beams can be generated by the UE at the same time. The combinations of the UE beams may be restricted by hardware capability, complexity, cost, or the like. For example, there are a total of four UE beams: {a, b, c, d}, and the UE can generate two UE beams at the same time. In addition, the UE can generate UE beam combinations: {a, b}, {b, c}, {c, d}, {a, d}, but it cannot generate UE beam combinations: {a, c}, {b, d}.

Providing the information related to valid UE beam combinations to a network by the UE is helpful for network scheduling. The information can be valid UE beam combination(s), a number of total digital UE beams, a number of total analog UE beams, a number of maximum concurrent analog UE beams, a number of UE antenna elements, and/or a number of UE antenna ports. If the network can control which UE beams are used for a transmission or reception, the network should be aware of which UE beam combination(s) are valid or not valid. And the network can schedule the transmission or the reception based on the information. A valid UE beam combination may mean a UE beam combination that can be generated at the same time.

Figure 24:
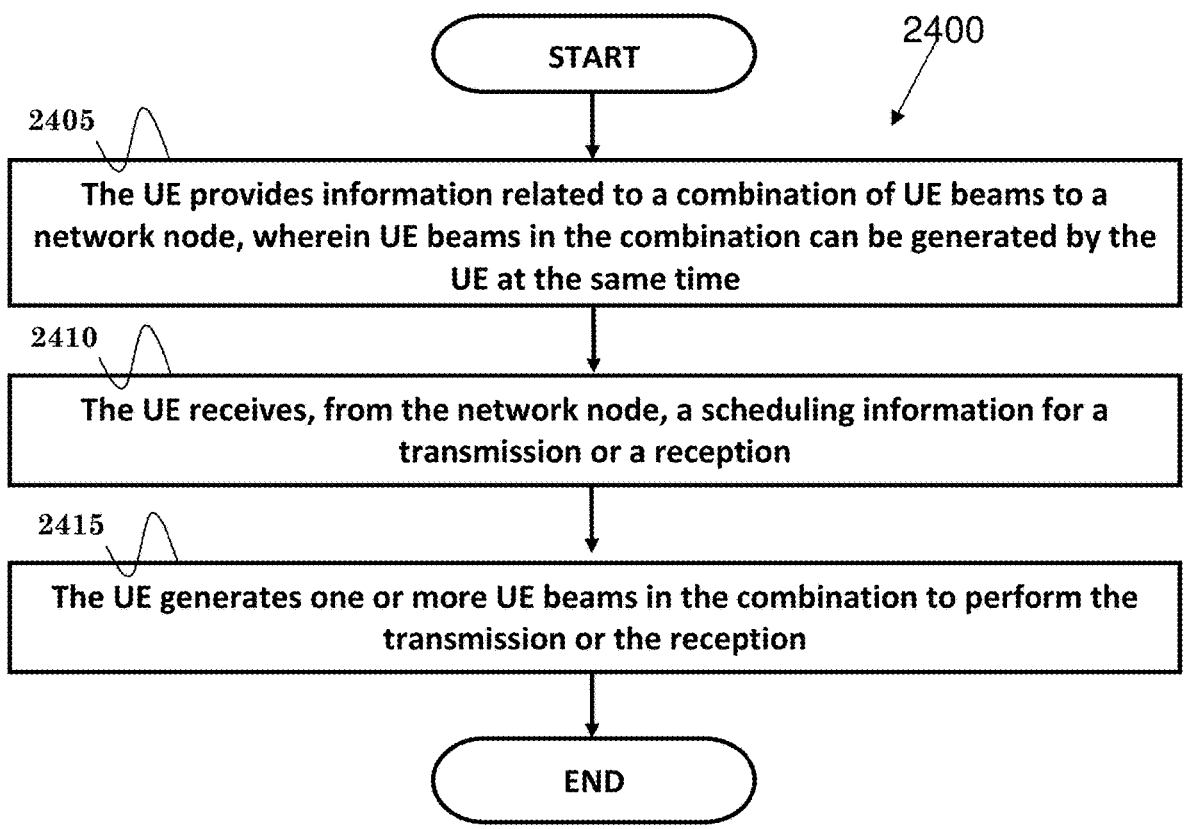
FIG. 24 is a flow chart according to one exemplary embodiment.

FIG. 24 is a flow chart 2400 according to one exemplary embodiment from the perspective of a UE. In step 2405, the UE provides information related to a combination of UE beams to a network node, wherein UE beams in the combination can be generated by the UE at the same time. In step 2410, the UE receives, from the network node, a scheduling information for a transmission or a reception. In step 2415, the UE generates one or more UE beams in the combination to perform the transmission or the reception.

Figure 25:
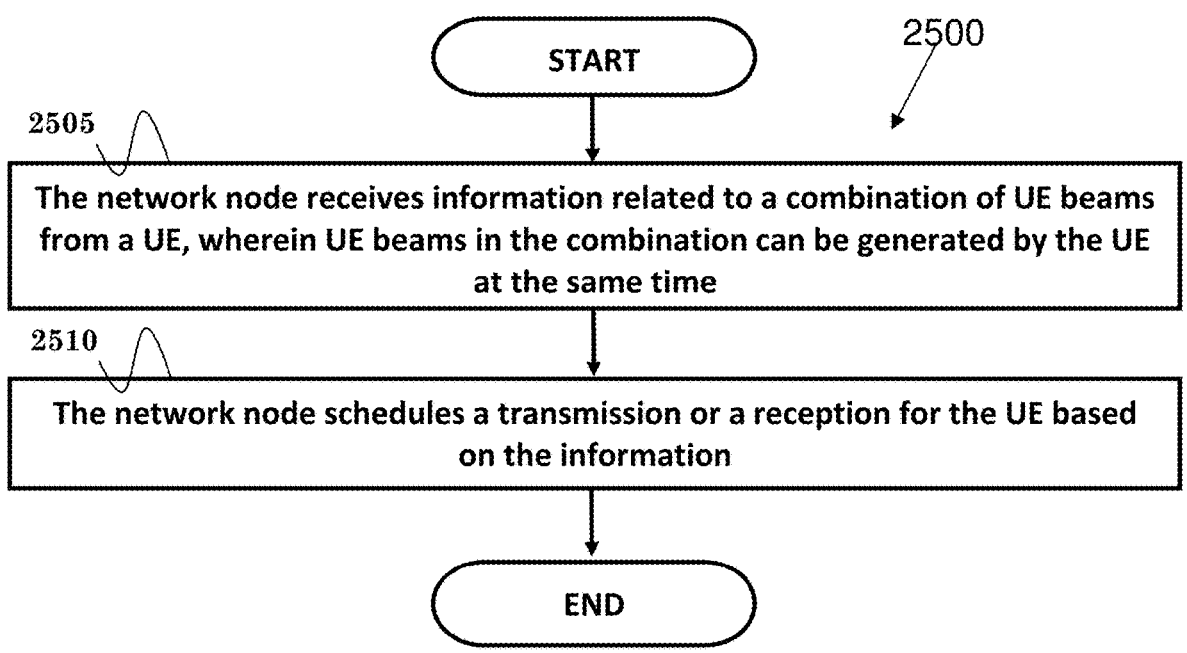
FIG. 25 is a flow chart according to one exemplary embodiment.

FIG. 25 is a flow chart 2500 according to one exemplary embodiment from the perspective of a network node. In step 2505, the network node receives information related to a combination of UE beams from a UE, wherein UE beams in the combination can be generated by the UE at the same time. In step 2510, the network node schedules a transmission or a reception for the UE based on the information.

In some methods, the information indicates at least one valid combination of UE beams. The information indicates a total number of digital and/or analog UE beams. The information indicates a maximum concurrent number of analog UE beams. The information indicates a number of UE antenna element and/or UE antenna port.

In some methods, the network node controls which UE beam(s) (in the combination) is used for the transmission or the reception based on the information. In the disclosed methods, the network node may be a TRP, base station, or a 5G node.

In some methods, the UE provides information related to UE beamforming capability to the network node. The UE cannot generate every combination of UE beams. The number of UE beams in a combination of UE beams equals to the number of UE beams that the UE can generate at the same time.

Referring back to FIGS. 3 and 4, in one embodiment, the device 300 includes a program code 312 stored in memory 310. The CPU 308 could execute program code 312 to enable the UE (i) to provide information related to a combination of UE beams to a network node, wherein UE beams in the combination can be generated by the UE at the same time; (ii) to receive, from the network node, a scheduling information for a transmission or a reception; and (iii) to generate one or more UE beams in the combination to perform the transmission or the reception.

In another embodiment, the CPU 308 could execute program code 312 to enable the network node (i) to receive information related to a combination of UE beams from a UE, wherein UE beams in the combination can be generated by the UE at the same time; and (ii) to schedule a transmission or a reception for the UE based on the information. Furthermore, the CPU 308 can execute the program code 312 to perform all of the above-described actions and steps or others methods described herein.

Based on the invention, UE beam(s) to be used for transmissions via pre-determined radio resources can be controlled efficiently.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a user equipment (UE) for transmission or reception using beamforming, the method comprising:
   providing information indicating a valid combination of UE beams to a network node, wherein the UE beams in the valid combination can be generated by the UE at the same time;
   receiving, from the network node, a Medium Access Control (MAC) signaling indicating a network beam;
   deriving a UE beam from the network beam indicated by the MAC signaling;
   receiving, from the network node and on the UE beam derived from the network beam indicated by the MAC signaling, a scheduling information for a reception in a Physical Downlink Control Channel (PDCCH) signaling, wherein the scheduling information received on the UE beam indicates specific UE beams in the valid combination to be used for the reception; and
   generating the specific UE beams in the valid combination to perform the reception based on the scheduling information, wherein the specific UE beams in the valid combination are concurrently to be served by multiple serving beams from multiple Transmission/Reception Points (TRPs) of a cell.

2. The method of claim 1, wherein a number of the UE beams in the valid combination equals to a number of UE beams that the UE can generate at the same time.

3. The method of claim 1, wherein the information indicates a total number of digital UE beams, a total number of analog UE beams, a maximum concurrent number of analog UE beams, a number of UE antenna elements, a number of UE antenna ports, or any combination thereof.

4. The method of claim 1, further comprising:
   providing information related to UE beamforming capability.

5. The method of claim 1, wherein the UE cannot generate every combination of UE beams.

6. A method for a network node for transmission or reception using beamforming, the method comprising:

receiving information indicating a valid combination of user equipment (UE) beams from a UE, wherein the UE beams in the valid combination can be generated by the UE at the same time;

transmitting a Medium Access Control (MAC) signaling indicating a network beam to be used by the UE for deriving a UE beam to be used for receiving a Physical Downlink Control Channel (PDCCH) signaling;

choosing specific UE beams from the valid combination to schedule the UE for a reception; and transmitting, to the UE and via the UE beam derived from the network beam indicated by the MAC signaling, a scheduling information in the PDCCH signaling to schedule the reception for the UE based on the information, wherein the scheduling information transmitted via the UE beam indicates the specific UE beams in the valid combination to be used by the UE for the reception, wherein the specific UE beams in the valid combination are concurrently to be served by multiple serving beams from multiple Transmission/Reception Points (TRPs) of a cell.

7. The method of claim 6, wherein a number of the UE beams in the valid combination equals to a number of UE beams that the UE can generate at the same time.

8. The method of claim 6, wherein the information indicates a total number of digital UE beams, a total number of analog UE beams, a maximum concurrent number of analog UE beams, a number of UE antenna elements, a number of UE antenna ports, or any combination thereof.

9. The method of claim 6, further comprising:
controlling which UE beam or beams are used for the reception based on the information.

10. The method of claim 6, further comprising:
receiving information related to UE beamforming capability from the UE.

11. A User Equipment (UE) for transmission or reception using beamforming comprising:
a control circuit;
a processor installed in the control circuit; and
a memory installed in the control circuit and coupled to the processor;
wherein the processor is configured to execute a program code stored in the memory to:
provide information indicating a valid combination of UE beams to a network node, wherein the UE beams in the valid combination can be generated by the UE at the same time;
receive, from the network node, a Medium Access Control (MAC) signaling indicating a network beam;
derive a UE beam from the network beam indicated by the MAC signaling;
receive, from the network node and on the UE beam derived from the network beam indicated by the MAC signaling, a scheduling information for a reception in a Physical Downlink Control Channel (PDCCH) signaling, wherein the scheduling information received on the UE beam indicates specific UE beams in the valid combination to be used for the reception; and
generate the specific UE beams in the valid combination to perform the reception based on the scheduling information, wherein the specific UE beams in the valid combination are concurrently to be served by multiple serving beams from multiple Transmission/Reception Points (TRPs) of a cell.

12. The UE of claim 11, wherein a number of the UE beams in the valid combination equals to a number of UE beams that the UE can generate at the same time.

13. The UE of claim 11, wherein the information indicates a total number of digital UE beams, a total number of analog UE beams, a maximum concurrent number of analog UE beams, a number of UE antenna elements, a number of UE antenna ports, or any combination thereof.

14. The UE of claim 11, further comprising:
providing information related to UE beamforming capability.

15. The UE of claim 11, wherein the UE cannot generate every combination of UE beams.

16. A network node for transmission or reception using beamforming comprising:
a control circuit;
a processor installed in the control circuit; and
a memory installed in the control circuit and coupled to the processor;
wherein the processor is configured to execute a program code stored in the memory to:
receive information indicating a valid combination of user equipment (UE) beams from a UE, wherein the UE beams in the valid combination can be generated by the UE at the same time;
transmit a Medium Access Control (MAC) signaling indicating a network beam to be used by the UE for deriving a UE beam to be used for receiving a Physical Downlink Control Channel (PDCCH) signaling;
choose specific UE beams from the valid combination to schedule the UE for a reception; and
transmit, to the UE and via the UE beam derived from the network beam indicated by the MAC signaling, a scheduling information in the PDCCH signaling to schedule the reception for the UE based on the information, wherein the scheduling information transmitted via the UE beam indicates the specific UE beams in the valid combination to be used by the UE for the reception, wherein the specific UE beams in the valid combination are concurrently to be served by multiple serving beams from multiple Transmission/Reception Points (TRPs) of a cell.

17. The network node of claim 16, wherein a number of the UE beams in the valid combination equals to a number of UE beams that the UE can generate at the same time.

18. The network node of claim 16, wherein the information indicates a total number of digital UE beams, a total number of analog UE beams, a maximum concurrent number of analog UE beams, a number of UE antenna elements, a number of UE antenna ports, or any combination thereof.

19. The network node of claim 16, further comprising:
controlling which UE beam or beams are used for the reception based on the information.

20. The network node of claim 16, further comprising:
receiving information related to UE beamforming capability from the UE.

* * * * *